(12) United States Patent
Lee

(10) Patent No.: US 8,270,823 B2
(45) Date of Patent: Sep. 18, 2012

(54) SHAKE CORRECTION MODULE HAVING PRESSING PORTIONS FOR PHOTOGRAPHING APPARATUSES

(75) Inventor: Kyung-bae Lee, Changwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1200 days.

(21) Appl. No.: 11/983,501

(22) Filed: Nov. 9, 2007

(65) Prior Publication Data
US 2008/0303907 A1  Dec. 11, 2008

(30) Foreign Application Priority Data
Jun. 7, 2007 (KR) .................. 10-2007-0055709

(51) Int. Cl.
 G03B 17/00 (2006.01)
 H04N 5/228 (2006.01)
(52) U.S. Cl. .................. 396/55; 348/208.2
(58) Field of Classification Search .................. 396/55; 348/208.2
See application file for complete search history.

(56) References Cited

U.S. PATENT DOCUMENTS

| | | | | |
|---|---|---|---|---|
| 6,603,927 | B2 * | 8/2003 | Enomoto | 396/55 |
| 7,388,616 | B2 * | 6/2008 | Yamazaki | 348/373 |
| 7,463,128 | B2 * | 12/2008 | Seo | 335/285 |
| 7,502,554 | B2 * | 3/2009 | Enomoto | 396/55 |
| 7,529,476 | B2 * | 5/2009 | Kurosawa | 396/55 |
| 7,577,346 | B2 * | 8/2009 | Liao et al. | 396/55 |
| 7,701,486 | B2 * | 4/2010 | Kosaka et al. | 348/208.7 |
| 2003/0067544 | A1 * | 4/2003 | Wada | 348/208.7 |
| 2006/0017815 | A1 * | 1/2006 | Stavely et al. | 348/208.7 |
| 2006/0051081 | A1 * | 3/2006 | Ogino | 396/55 |
| 2006/0164516 | A1 * | 7/2006 | Kurosawa | 348/208.99 |
| 2006/0177208 | A1 * | 8/2006 | Ito et al. | 396/55 |
| 2006/0257128 | A1 * | 11/2006 | Ishito et al. | 396/55 |
| 2006/0279638 | A1 * | 12/2006 | Matsuda et al. | 348/208.7 |
| 2007/0058076 | A1 | 3/2007 | Seo | |
| 2007/0242938 | A1 * | 10/2007 | Uno et al. | 396/55 |
| 2008/0055420 | A1 * | 3/2008 | Orihashi et al. | 348/208.4 |
| 2008/0100715 | A1 * | 5/2008 | Chang et al. | 348/208.7 |

FOREIGN PATENT DOCUMENTS

JP  2003-110919 A  4/2003

OTHER PUBLICATIONS

Office Action established for CN 200710159880.7 (Aug. 11, 2011).

* cited by examiner

*Primary Examiner* — Clayton E LaBalle
*Assistant Examiner* — Bret Adams
(74) *Attorney, Agent, or Firm* — Drinker Biddle & Reath LLP

(57) ABSTRACT

A shake correction module for a photographing apparatus, including a base plate, a first slider member capable of moving in a first axis direction with respect to the base plate and accommodating a photographing device, a first drive portion moving the first slider member in the first axis direction, a second slider member capable of moving in a second axis direction that is perpendicular to the first axis direction, a second drive portion moving the second slider member in the second axis direction, and a support member attached to the base plate and pressing one of the first and second slider members. The shake correction module can reduce the effect of shaking during photographing.

21 Claims, 4 Drawing Sheets

SHAKE CORRECTION MODULE HAVING PRESSING PORTIONS FOR PHOTOGRAPHING APPARATUSES

CROSS-REFERENCE TO RELATED PATENT APPLICATIONS

This application claims the benefit of Korean Patent Application No. 10-2007-0055709, filed on Jun. 7, 2007, in the Korean Intellectual Property Office, the disclosure of which is incorporated herein in its entirety by reference.

BACKGROUND OF THE INVENTION

1. Field of the Invention

The present invention relates to a photographing apparatus, and more particularly, to a shake correction module for a photographing apparatus, which can reduce the effect of shaking during photographing.

2. Description of the Related Art

As the widespread use of photographing apparatuses such as digital still cameras and digital video cameras continues to grow, users are demanding higher quality photos and motion pictures. Therefore, camera manufacturers are increasingly using shake correction modules in photographing apparatuses to reduce degradation in the resolution of photos due to the shaking of a user's hand when recording a photograph or motion picture. A conventional shake correction module performs shake correction by moving the lens or imaging device of a photographing apparatus.

FIG. 1 is a perspective view of a conventional shake correction module 1 in which a shake correction function is performed by moving an imaging device. Referring to FIG. 1, the conventional shake correction module 1 includes a base plate 2, a slider member 3, and an imaging device base 4.

The base plate 2 is installed at a lens barrel (not shown) of a photographing apparatus. The slider member 3 is installed on the base plate 2 and is capable of reciprocating in an x-axis direction with respect to the base plate 2. The imaging device base 4 is installed at the slider member 3. An imaging device (not shown) such as a charge coupled device (CCD) is installed in the imaging device base 4.

Also, the imaging device base 4 is configured to reciprocate in a y-axis direction with respect to the slider member 3. Thus, the imaging device can reciprocate in x and y axes directions with respect to the base plate 2. Although not illustrated in FIG. 1, the slider member 3 and the imaging device base 4 are moved respectively by a drive unit. Thus, when a shake occurs in a photographing apparatus, the shake correction module 1 compensates for the shake by moving the imaging device base 4 in the x and y axes directions.

A spring 5 is installed between a protruding portion 3a of the slider member 3 and a protruding portion 2a of the base plate 2. The spring 5 provides an elastic force to prevent the slider member 3 and the imaging device base 4 from separating from the base plate 2 in a z-axis direction.

However, in the structure of the conventional shake correction module 1, during the shake correction, since the spring 5 is used only at a side of the slider member 3, the operation of the elastic force is not uniformly applied to the whole surface of the shake correction module 1. Thus, during the shake correction, since the base plate 2, the slider member 3, and the imaging device base 4 move by being inclined to one another, the correction performance of the shake correction module 1 is deteriorated. That is, as the elastic force is maximal around a portion of the shake correction module 1 where the spring 5 is installed, the inclination of parts increases. Accordingly, a contact pressure between parts becomes excessive and accordingly a frictional force increases. Thus, the shake correction is not smoothly performed.

SUMMARY OF THE INVENTION

To solve the above and/or other problems, the present invention provides a shake correction module for a photographing apparatus, which can be used to stably perform a shake correction function. The following paragraphs describe various embodiments of the present invention.

According to an embodiment of the present invention, a shake correction module includes a base plate, a first slider member capable of moving in a first axis direction with respect to the base plate and accommodating an imaging device, a first drive portion moving the first slider member in the first axis direction, a second slider member capable of moving in a second axis direction that is cross to the first axis direction, a second drive portion moving the second slider member in the second axis direction, and a support member attached to the base plate and pressing one of the first and second slider members, whichever is located farther from the base plate.

The first slider member includes an imaging device accommodation portion for accommodating an imaging device.

The shake correction module further includes an elastic member disposed between the imaging device accommodation portion and the imaging device.

The shake correction module further includes a movement measuring magnet disposed at a side of the first slider member and a Hall sensor installed at a portion of the base plate corresponding to the movement measuring magnet.

The first slider member is arranged between the second slider member and the base plate.

The shake correction module further includes a pressing magnet arranged at a side of the second slider member and a ferromagnet installed in the base plate to correspond to the pressing magnet.

Each of the first drive portion and the second drive portion comprises a piezzo-electric motor.

The first axis direction and the second axis direction are perpendicular to each other.

The support member comprises a plurality of support legs attached to the base plate.

The shake correction module further includes an installation hole having a thread formed on an inner circumferential surface thereof and formed in each of the support legs, and a plurality of first installation holes formed in the base plate to correspond to the mounting holes, wherein the support legs are coupled to the base plate by inserting a bolt in the mounting holes through the first installation holes.

The support member includes a plurality of pressing portions pressing one of the first slider member and the second slider member, whichever is located farther from the base plate.

The shake correction module further includes a support bearing arranged between the pressing portion and one of the first slider member and the second slider member, whichever is located farther from the base plate.

The shake correction module further includes a support bearing plate arranged to support the support bearing.

The shake correction module further comprises a control circuit board attached to an upper surface of the support member.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
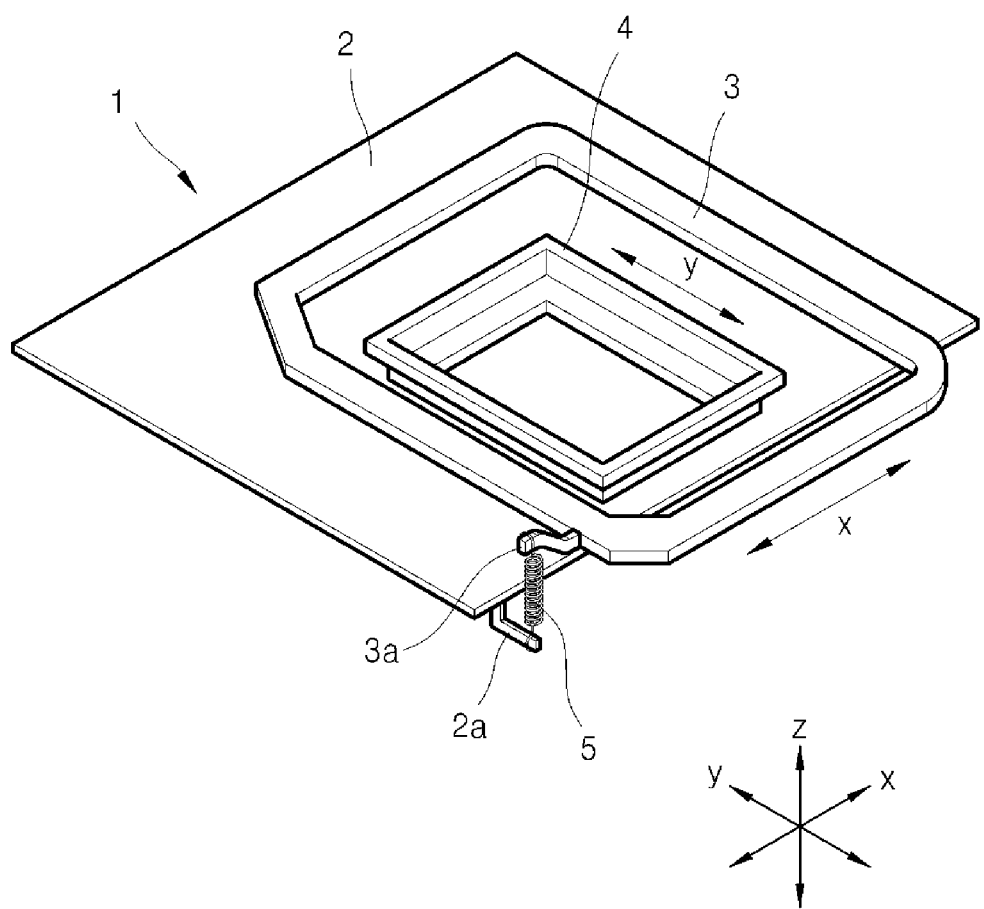
FIG. 1 is a perspective view of a conventional shake correction module.
Figure 2:
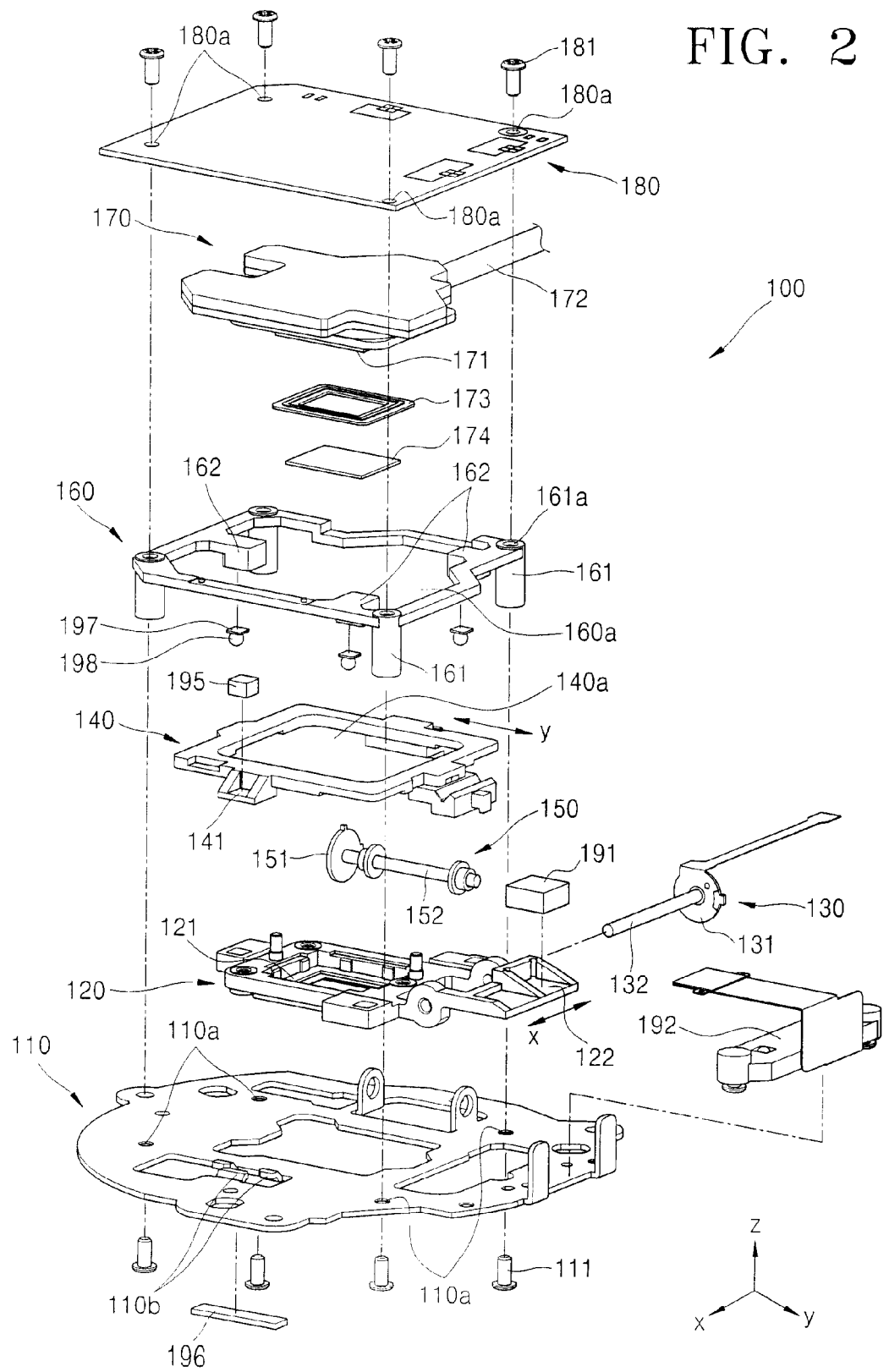
FIG. 2 is an exploded perspective view of a shake correction module for a photographing apparatus according to an embodiment of the present invention.
Figure 3:
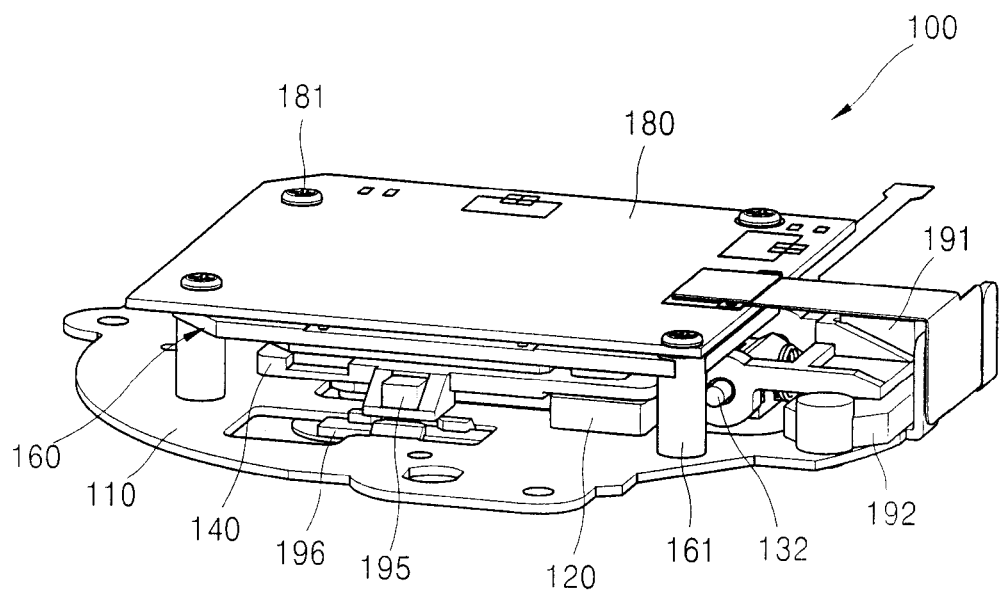
FIG. 3 is an assembled perspective view of the shake correction module of FIG. 2, according to an embodiment of the present invention.
Figure 4:
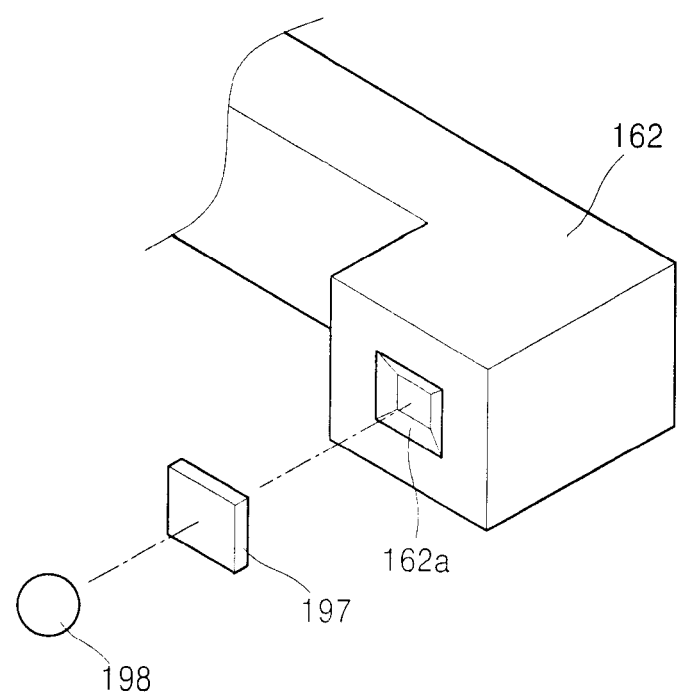
FIG. 4 is a perspective view of a bottom surface of a pressing portion of a support member of the shake correction module of FIG. 2, according to an embodiment of the present invention.
Figure 5:
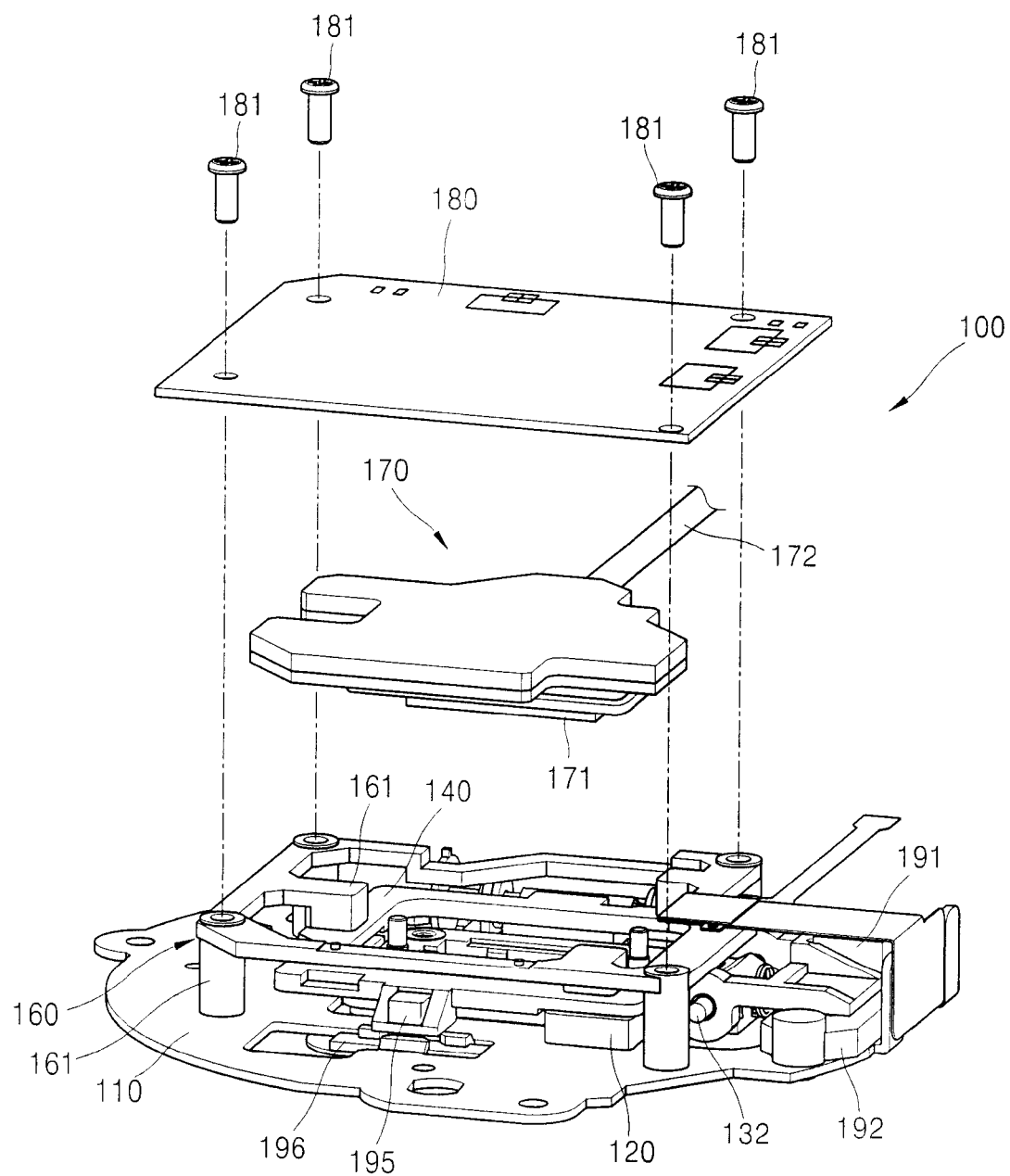
FIG. 5 is an exploded, partially assembled perspective view of the shake correction module of FIG. 2, according to an embodiment of the present invention.

FIG. 2 is an exploded perspective view of a shake correction module 100 for a photographing apparatus according to an embodiment of the present invention. FIG. 3 is an assembled perspective view of the shake correction module 100 of FIG. 2. FIG. 4 is a perspective view of a bottom surface of a pressing portion 162 of a support member 160 of the shake correction module 100 of FIG. 2, according to an embodiment of the present invention. FIG. 5 is an exploded, partially assembled perspective view of the shake correction module of FIG. 2.

Referring to FIG. 2, the shake correction module 100 for a photographing apparatus according to an embodiment of the present invention includes a base plate 110, a first slider member 120, a first drive portion 130, a second slider member 140, a second drive portion 150, the support member 160, an imaging device assembly 170, and a control circuit board 180.

The base plate 110 is arranged at the lowermost side of the shake correction module 100, is formed of metal or synthetic resin that has a relatively high rigidity, and functions as the main frame of the shake correction module 100. The base plate 110 has a plate shape. Four first installation holes 110a to attach the support member 160 to the base plate 110 are formed in the base plate 110. A ferromagnetic accommodation portion 110b for accommodating a ferromagnet 196 is also formed in the base plate 110.

The first slider member 120 is capable of moving in the x-axis direction with respect to the base plate 110. The first slider member 120 includes an imaging device accommodation portion 121 for accommodating an imaging device 171, and a magnetic arrangement portion 122 for measuring movement and formed at a side of the first slider member 120.

A movement measuring magnet 191 is disposed in the magnetic arrangement portion 122 to measure the movement of the first slider member 120. That is, since a Hall sensor 192 is installed at a portion of the base plate 110 corresponding to the movement measuring magnet 191, the movements of the first slider member 120 and the imaging device 171 in first and second axis directions can be measured. Here, the Hall sensor 192 is a device using a principle that the amount of a current or voltage that is induced changes according to the strength of a magnetic field.

In the present embodiment, the first axis direction is the x-axis direction, the second axis direction is the y-axis direction, and the first and second axis directions are perpendicular to each other. However, the present invention is not limited thereto. That is, the first and second axis directions do not necessarily have to cross at a right angle, as do the x axis and the y axis of the present embodiment. The crossing angle of the first and second axis directions can also be an acute angle or an obtuse angle.

The first drive portion 130 is installed in the base plate 110 and includes a first piezzo-electric motor 131 and a first drive shaft 132. The first drive shaft 132 is coupled to the first slider member 120. When the first piezzo-electric motor 131 is driven, the first drive shaft 132 moves linearly and then the first slider member 120 moves linearly in the x-axis direction.

According to the present embodiment, the first drive portion 130 includes the first piezzo-electric motor 131, but the present invention is not limited thereto. That is, the type of apparatus providing a driving force to the first drive portion 130 is not particularly limited and any apparatus capable of reciprocating the first drive shaft 132 in a linear direction by receiving an external signal can be employed. For example, an electromagnetic apparatus or a micro motor can be used to provide a driving force to the first drive portion 130.

The second slider member 140 is disposed above the first slider member 120, has an opening 140a in the center thereof, and has a shape of a rectangular ring. Although in the present embodiment the second slider member 140 has a rectangular ring shape and includes the opening 140a in the center thereof, the present invention is not limited thereto. That is, there is no special limitation in the shape of the second slider member 140. For example, the second slider member 140 can have a variety of shapes such as a plate or a circular ring.

A pressing magnet arrangement portion 141 is provided at a side of the second slider member 140. A pressing magnet 195 is disposed in the pressing magnet arrangement portion 141 so that the second slider member 140 more firmly contacts the base plate 110 thus facilitating a movement control of the second slider member 140. That is, as the ferromagnet 196 is disposed in the ferromagnetic accommodation portion 110b of the base plate 110, a magnetic force acts between the pressing magnet 195 and the ferromagnet 196 which pulls the second slider member 140 toward the base plate 110.

Although in the present embodiment the pressing magnet 195 is disposed in the pressing magnet arrangement portion 141 of the second slider member 140 and the ferromagnet 196 is disposed in the base plate 110, the present invention is not limited thereto. That is, according to the present invention, since the support member 160 sufficiently presses the second slider member 140, the pressing magnet 195 and the ferromagnet 196 do not need to be used for the purpose of simply pressing. However, for the movement control of the second slider member 140, when a magnetic force acts between the second slider member 140 and the base plate 110, it becomes easier to control the movement of the second slider member 140. Accordingly, such a structure is used in the present embodiment.

The second drive portion 150 is installed in the base plate 110 and includes a second piezzo-electric motor 151 and a second drive shaft 152. The second drive shaft 152 is coupled to the second slider member 140. When the second piezzo-electric motor 151 is driven, the second drive shaft 152 moves in a linear direction. Then, the second slider member 140 moves linearly in the y-axis direction.

According to the present embodiment, the first drive shaft 132 of the first drive portion 130 is arranged in the x-axis direction and the second drive shaft 152 of the second drive portion 150 is arranged in the y-axis direction. Accordingly, although the movement direction of the first drive shaft 132 and the movement direction of the second drive shaft 152 are perpendicular to each other, the present invention is not limited thereto. That is, according to the present invention, the movement direction of the first drive shaft 132 and the movement direction of the second drive shaft 152 can be configured not to be perpendicular to each other and to have a crossing angle that is acute or obtuse. In this case, the crossing angle between the relative movement directions of the first and second slider members can be acute or obtuse.

Although in the present embodiment the second drive portion 150 includes the second piezzo-electric motor 151, the present invention is not limited thereto. That is, the type of apparatus providing a driving force to the second drive portion 150 is not particularly limited and any apparatus capable of reciprocating the drive shaft 152 in a linear direction by receiving an external signal can be employed. For example, an electromagnetic apparatus or a micro motor can be used to provide a driving force to the second drive portion 150.

An opening portion 160a is formed in the center of the support member 160. The support member 160 has a rectangular ring shape and includes a plurality of support legs 161 and a plurality of pressing portions 162.

In the present embodiment, there are four of the support legs 161, each of which has a mounting hole 161a formed in the center thereof and has a thread formed on an inner circumferential surface thereof. Since the mounting holes 161a are formed to penetrate each of the support legs 161, the support legs 161 have a hollow cylindrical shape.

First installation bolts 111 are inserted in the mounting holes 161a by passing through the first installation holes 110a of the base plate 110 so that the support legs 161 of the support member 160 can be attached to the base plate 110. Also, the support legs 161 function not only to attach the support member 160 to the base plate 110 but also to attach the control circuit board 180 to the support member 160. Although in the present embodiment the number of the support legs 161 is four, the present invention is not limited thereto. That is, there is no special limitation in the number of the support legs 161.

The pressing portions 162 protrude toward the center of the support member 160 and have a function to directly press the second slider member 140 from above. For this purpose, a support bearing plate 197 and a support bearing 198 are arranged between each of the pressing portions 162 and the second slider member 140. That is, as illustrated in FIG. 4, a groove 162a is formed in the bottom surface of each of the pressing portions 162. The support bearing plate 197 and the support bearing 198 are arranged in the groove 162a. As the lower surface of the support bearing 198 contacts a part of an upper surface of the second slider member 140, the support member 160 presses the second slider member 140 downwardly.

Although in the present embodiment the support bearing 198 is a ball bearing, the present invention is not limited thereto. That is, according to the present invention, the support bearing 198 can also be, for example, a roller bearing.

According to the present embodiment, the pressing portions 162 are formed at three positions of the support member 160 in a triangular arrangement with the opening portion 160a at the center thereof, to uniformly press the second slider member 140. Because a balanced pressing force is maintained by the triangular arrangement of the pressing portions 162 in the present embodiment, a shake correction function can be stably performed. To uniformly press the entire upper surface of the second slider member 140, the pressing portions 162 are appropriately arranged along the circumference of the support member 160.

Although in the present embodiment there are three pressing portions 162 of the support member 160, the present invention is not limited thereto. That is, as long as the support member 160 uniformly presses the second slider member 140 to maintain a balanced pressing force, there is no limitation in the number of the pressing portions 162. For example, there can be one pressing portion 162 of the supporting member 160.

Although in the present embodiment the support bearing plate 197 and the support bearing 198 are arranged only between the support member 160 and the second slider member 140, the present invention is not limited thereto. That is, according to the present invention, the support bearing plate 197 and the support bearing 198 can be arranged between the second slider member 140 and the first slider member 120 and between the first slider member 120 and the base plate 110, and thus an appropriate pressing force can be provided and a horizontal movement for the shake correction function is possible.

The imaging device assembly 170 includes the imaging device 171 and a cable 172. The imaging device 171 is a device to convert light input by passing through lenses such as a zoom lens and a shake correction lens to an electrical signal. The imaging device 171 may be a charge coupled device (CCD) or a complementary metal oxide semiconductor (CMOS) device. Since a CMOS device can convert an image light of an object to an electrical signal at a higher speed than a CCD device, a time for synthesizing an image after the object is photographed can be shortened.

The cable 172 can be a flexible printed circuit board (FPCB). A signal output from the imaging device 171 is transmitted via the cable 172 to a circuit (not shown) for processing an image in the photographing apparatus. The imaging device 171 of the imaging device assembly 170 is accommodated in the imaging device accommodation portion 121. An elastic member 173 and an infrared (IR) filter 174 are arranged between the imaging device 171 and the imaging device accommodation portion 121. The elastic member 173 is formed of an elastic material such as synthetic rubber to prevent the imaging device 171 from directly contacting the IR filter 174 and accommodate the imaging device 171 in the imaging device accommodation portion 121 with an appropriate elasticity.

The control circuit board 180 is attached to an upper surface of the support member 160 to perform the shake correction function. Namely the control circuit board 180 drives and controls the first drive portion 130 and the second drive portion 150, processes a signal obtained from the Hall sensor 192, and performs the shake correction function.

The control circuit board 180 is attached to the upper surface of the support member 160. For this purpose, a plurality of second installation holes 180a are formed in the control circuit board 180. That is, as the second installation holes 180a are formed to correspond to the mounting holes 161a of the support legs 161, the control circuit board 180 can be attached to the upper surface of the support member 160 using a plurality of second installation bolts 181.

Although the shake correction module 100 according to the current embodiment of the present invention includes the control circuit board 180, the present invention is not limited thereto. That is, according to the present invention, the shake correction module 100 may not include the control circuit board 180. In this case, a CPU (not shown) of the photographing apparatus can perform the function of the control circuit board 180.

In the operation of the shake correction module 100 according to the present embodiment, referring to the shake correction module 100 of FIG. 2, when a shake occurs during photographing, the shake is detected by a shake detection unit (not shown) provided in the photographing apparatus. A gyro sensor or an acceleration sensor can be used as the shake detection unit. Data directly relating to the amount and direction of the shake measured by the shake detection unit is transferred to the control circuit board 180. The shake detection unit can be arranged outside the control circuit board 180 or directly arranged on the control circuit board 180.

The control circuit board 180 calculates the necessary amount of a movement of the first slider member 120 where the imaging device 171 is accommodated to correct the detected shake. The calculated amount of the movement is measured in terms of movements in the x-axis and y-axis directions.

Next, the control circuit board 180 drives the first drive portion 130 and the second drive portion 150 based on the calculated amount of the movements in the x-axis and y-axis directions so that the first slider member 120 is moved by the calculated movement amount. That is, the control circuit board 180 drives the first drive portion 130 to linearly move the first drive shaft 132 in order to move the first slider member 120 in the x-axis direction.

Also, since the first slider member 120 is moved in engagement with the second slider member 140 in the y-axis direction, the control circuit board 180 drives the second drive portion 150 to move the first slider member 120 in the y-axis direction so that the first and second slider members 120 and 140 are moved together.

The movements of the first slider member 120 in the x-axis and y-axis directions are measured using the movement measuring magnet 191 and the Hall sensor 192. The measured data is transferred to the control circuit board 180 to be used as a feedback signal to control the first and second drive portions 130 and 150.

As described above, when the first slider member 120 is appropriately moved in a direction to correct the shake, the imaging device 171 accommodated in the first slider member 120 is moved so that the shake correction is performed during photographing.

The support member 160 uniformly presses the second slider member 140 from above using the three pressing portions 162 so that the movement of the first and second slider members 120 and 140 in the z-axis direction is restricted. Then, even when the first and second slider members 120 and 140 move for the shake correction, a relative inclination between parts is prevented and a parallel movement is possible so that the shake correction performance is improved.

Also, since the support member 160 firmly presses the second slider member 140, even when a strong shock is applied from the outside, for example, a precipitation of the photographing apparatus, the first slider member 120 and the second slider member 140 of the shake correction module 100 are not dissembled but stably maintained so that the durability of the shake correction module 100 is improved. Thus, the shake correction function of the shake correction module 100 according to the present embodiment can be stably performed because the shake correction module 100 includes the support member 160 to uniformly press the second slider member 140.

As described above, the shake correction module for a photographing apparatus according to the present invention can stably perform a shake correction function.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A shake correction module comprising:
   a base plate;
   a first slider member capable of moving in a first axis direction with respect to the base plate;
   a first drive portion moving the first slider member in the first axis direction;
   a second slider member capable of moving in a second axis direction that is cross to the first axis direction;
   a second drive portion moving the second slider member in the second axis direction; and
   a support member attached to the base plate and pressing the second slider member into contact with the base plate, wherein the pressing is carried out by a plurality of pressing portions, each pressing portion comprising a bearing disposed between the support member and second slider member,
   wherein one side of the second slider member faces the base plate, and the support member presses the other side of the second slider member.

2. The shake correction module of claim 1, wherein the first slider member comprises an imaging device accommodation portion for accommodating an imaging device.

3. The shake correction module of claim 2, further comprising an elastic member disposed between the imaging device accommodation portion and the imaging device.

4. The shake correction module of claim 1, further comprising:
   a movement measuring magnet disposed at a side of one of the first and second slider members; and
   a Hall sensor installed at a portion of the base plate, the Hall sensor providing a signal corresponding to the movement measuring magnet.

5. The shake correction module of claim 1, wherein the first slider member is arranged between the second slider member and the base plate.

6. The shake correction module of claim 1, further comprising:
   a pressing magnet arranged on one of the first and second slider members; and
   a ferromagnet installed in the base plate, wherein the pressing magnet is arranged such that its attraction to the ferromagnet causes it to press one of the first and second slider members.

7. The shake correction module of claim 1, wherein at least one of the first drive portion and the second drive portion comprises a piezzo-electric motor.

8. The shake correction module of claim 1 wherein the second axis direction crosses the first axis direction at one of a right angle, an acute angle and an obtuse angle.

9. The shake correction module of claim 1, wherein the support member comprises a plurality of support legs attached to the base plate.

10. The shake correction module of claim 9, wherein
   each of the plurality of support legs of the support member includes a mounting hole having a corresponding installation hole in the base plate, and
   the base plate is coupled to the support member by a plurality of bolts, each bolt passing through the mounting hole of each support leg of the support member and through the corresponding installation hole in the base plate.

11. The shake correction module of claim 1 wherein the pressing portions are arranged along the circumference of the support member such that they substantially uniformly press the second slider member.

12. The shake correction module of claim 1, wherein each pressing portion further comprises a support bearing plate arranged to support the bearing.

13. The shake correction module of claim 1, further comprising a control circuit board attached to a surface of the support member.

14. A method for correcting shake in a digital photographing apparatus having a shake correction module with a base plate, a first slider member driven by a first drive portion, a second slider member driven by a second drive portion, and a support member attached to the base plate, the method comprising the steps of:
  maintaining a substantially balanced pressing force on the second slider member by the support member to press the second slider member into contact with the base plate;
  detecting a shake movement;
  in response to the detected shake movement, signaling the first drive portion to drive the first slider member; and
  in response to the shake movement, signaling the second drive portion to drive the second slider member,
  wherein one side of the second slider member faces the base plate, and the support member presses the other side of the second slider member.

15. The method of claim 14, wherein the balanced pressing force is at least partially maintained by a plurality of pressing portions arranged along the circumference of the support member to uniformly press the second slider member into the contact with the base plate.

16. The method of claim 14, wherein the balanced pressing force is at least partially maintained by one of a plurality of magnets and a plurality of bearings.

17. A shake correction module for a digital photographing apparatus comprising:
  a base plate;
  a first slider that corrects shake by moving in a first direction;
  a second slider that corrects shake by moving in a second direction that is cross to the first direction; and
  a support member having a pressing mechanism that uniformly presses the first slider at a plurality of locations into contact with the base plate,
  wherein one side of the second slider member faces the base plate, and the support member presses the other side of the second slider member.

18. The shake correction module of claim 17, wherein
  the first slider includes an opening portion, and
  the pressing mechanism presses the first slider at three locations, the three locations forming a triangular arrangement with the opening portion at the center.

19. The shake correction module of claim 17, further comprising a pressing magnet arranged on one of the first and second sliders and a ferromagnet arranged on the base plate, wherein the pressing magnet is arranged such that its attraction to the ferromagnet causes it to press one of the first and second sliders toward the base plate.

20. The shake correction module of claim 17, wherein the pressing mechanism comprises one of a plurality of bearings and a plurality of magnets.

21. The shake correction module of claim 17, wherein the second direction crosses the first direction at one of a right angle, an acute angle and an obtuse angle.

\* \* \* \* \*